US012683709B2

(12) United States Patent
Portnik et al.

(10) Patent No.: US 12,683,709 B2
(45) Date of Patent: Jul. 14, 2026

(54) PUNCTURING TO SCHEDULE DOWNLINK PHYSICAL DATA SHARED CHANNEL ON PHYSICAL DOWNLINK CONTROL CHANNEL SYMBOLS

(71) Applicant: Dell Products L.P., Round Rock, TX (US)

(72) Inventors: Ilya Portnik, Ashton (CA); Eran Goldstein, Montreal (CA); Jayaram Venguduswamy Srinivasan, Nepean (CA); Libin Jose Meledam, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 420 days.

(21) Appl. No.: 18/490,970

(22) Filed: Oct. 20, 2023

(65) Prior Publication Data

US 2025/0132860 A1     Apr. 24, 2025

(51) Int. Cl.
*H04L 1/00*          (2006.01)
*H04W 72/1273*       (2023.01)
*H04W 72/23*         (2023.01)

(52) U.S. Cl.
CPC ....... *H04L 1/0013* (2013.01); *H04W 72/1273* (2013.01); *H04W 72/23* (2023.01)

(58) Field of Classification Search
CPC .. H04L 1/0013; H04W 72/23; H04W 72/1273
See application file for complete search history.

(56) References Cited

U.S. PATENT DOCUMENTS

| | | | | |
|---|---|---|---|---|
| 2016/0028521 A1* | 1/2016 | Shimezawa | ........... | H04L 5/0051 |
| | | | | 370/329 |
| 2018/0167932 A1* | 6/2018 | Papasakellariou | .... | H04L 1/1887 |
| 2020/0186306 A1* | 6/2020 | Sun | ........................... | H04L 1/08 |
| 2023/0379092 A1* | 11/2023 | Chin | ..................... | H04L 1/1822 |
| 2025/0126608 A1 | 4/2025 | Portnik et al. | | |

FOREIGN PATENT DOCUMENTS

| | | | | | |
|---|---|---|---|---|---|
| CN | 110663206 A | * | 1/2020 | ............ | H04W 76/27 |
| WO | WO-2015020127 A1 | * | 2/2015 | ............ | H04W 72/23 |
| WO | WO-2018075472 A1 | * | 4/2018 | ............ | H04W 72/23 |
| WO | WO-2018082387 A1 | * | 5/2018 | ............ | H04W 72/23 |

* cited by examiner

*Primary Examiner* — Samina F Choudhry
(74) *Attorney, Agent, or Firm* — AMIN, TUROCY & WATSON, LLP

(57) ABSTRACT

The technology described herein is directed towards puncturing physical downlink shared channel (PDSCH) data in a defined slot symbol, otherwise reserved for CORESET (control resource set) information, with physical downlink control channel (PDCCH) information. A scheduler schedules PDSCH data into the otherwise defined/reserved symbol. Network equipment (e.g., a gNodeB) then overwrites at least some of the PDSCH data in that symbol with the PDCCH information, resulting in punctured PDSCH data in that symbol. For transmitting, the coding rate/repetition pattern is adjusted by the network equipment such that a receiving user equipment is able to recover the overwritten PDSCH data during decoding. As a result, an entire symbol otherwise used only for PDCCH information is able to be used for PDSCH data.

20 Claims, 10 Drawing Sheets

100
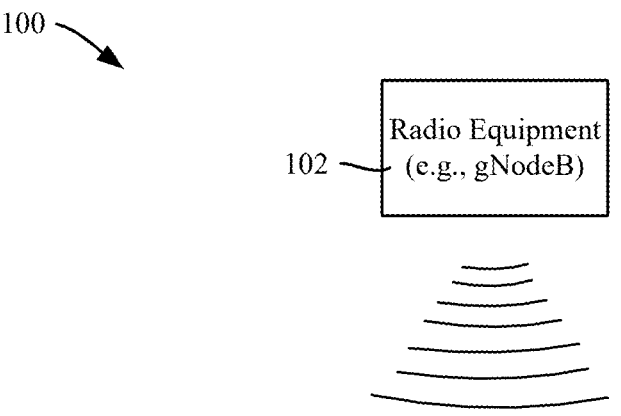
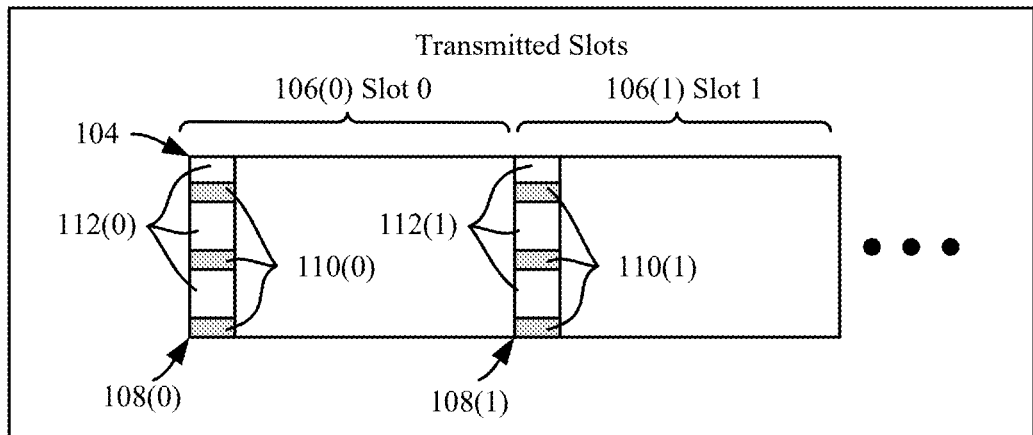
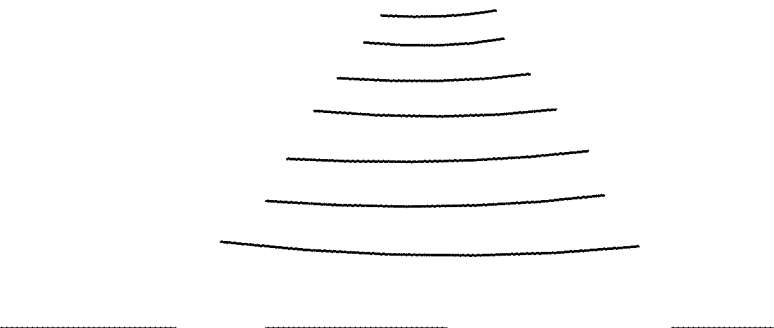
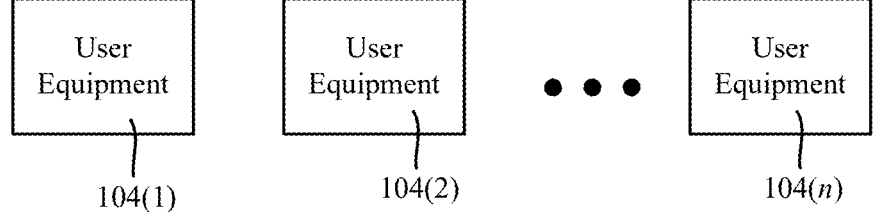
FIG. 1

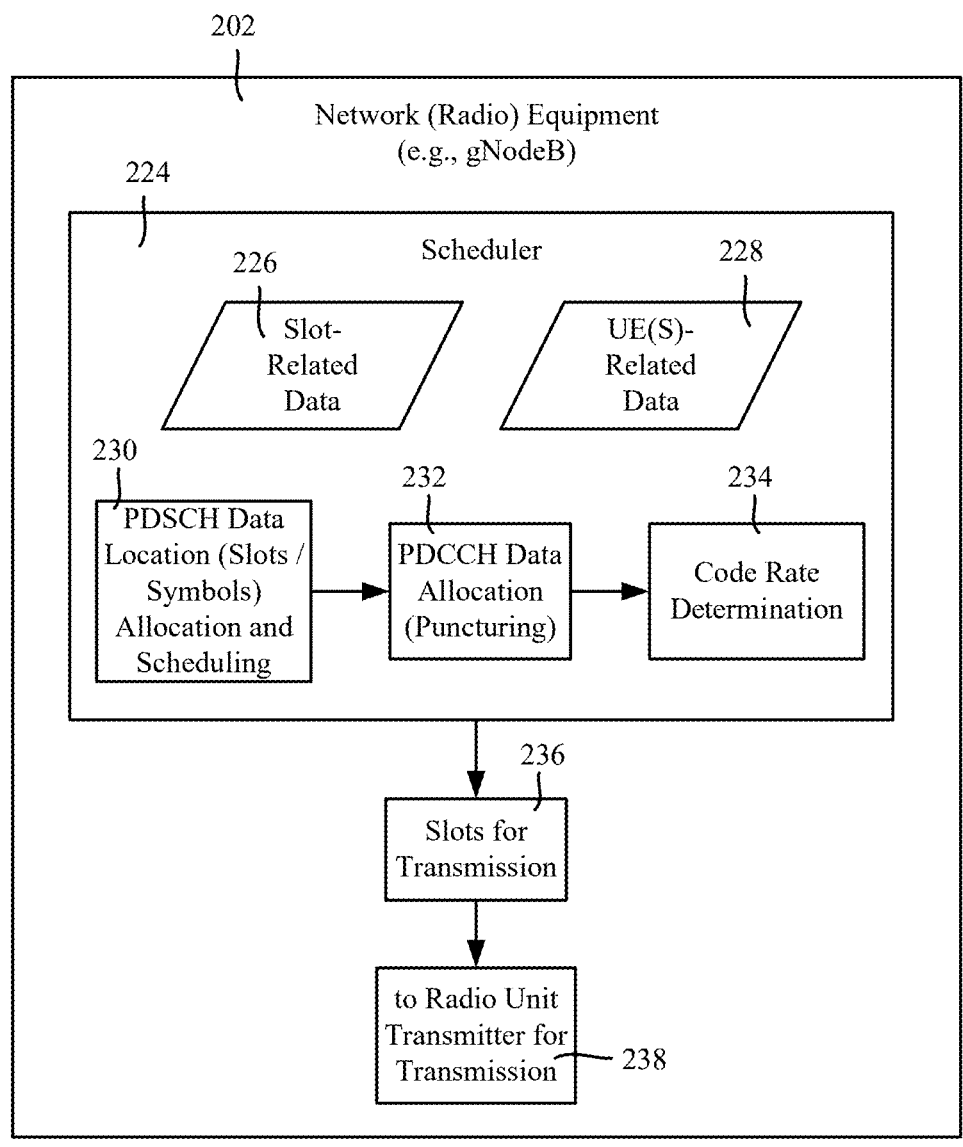
202
Network (Radio) Equipment
(e.g., gNodeB)
224
Scheduler
226 — Slot-Related Data
228 — UE(S)-Related Data
230 — PDSCH Data Location (Slots / Symbols) Allocation and Scheduling
232 — PDCCH Data Allocation (Puncturing)
234 — Code Rate Determination
236 — Slots for Transmission
238 — to Radio Unit Transmitter for Transmission
*To User Equipment*
FIG. 2

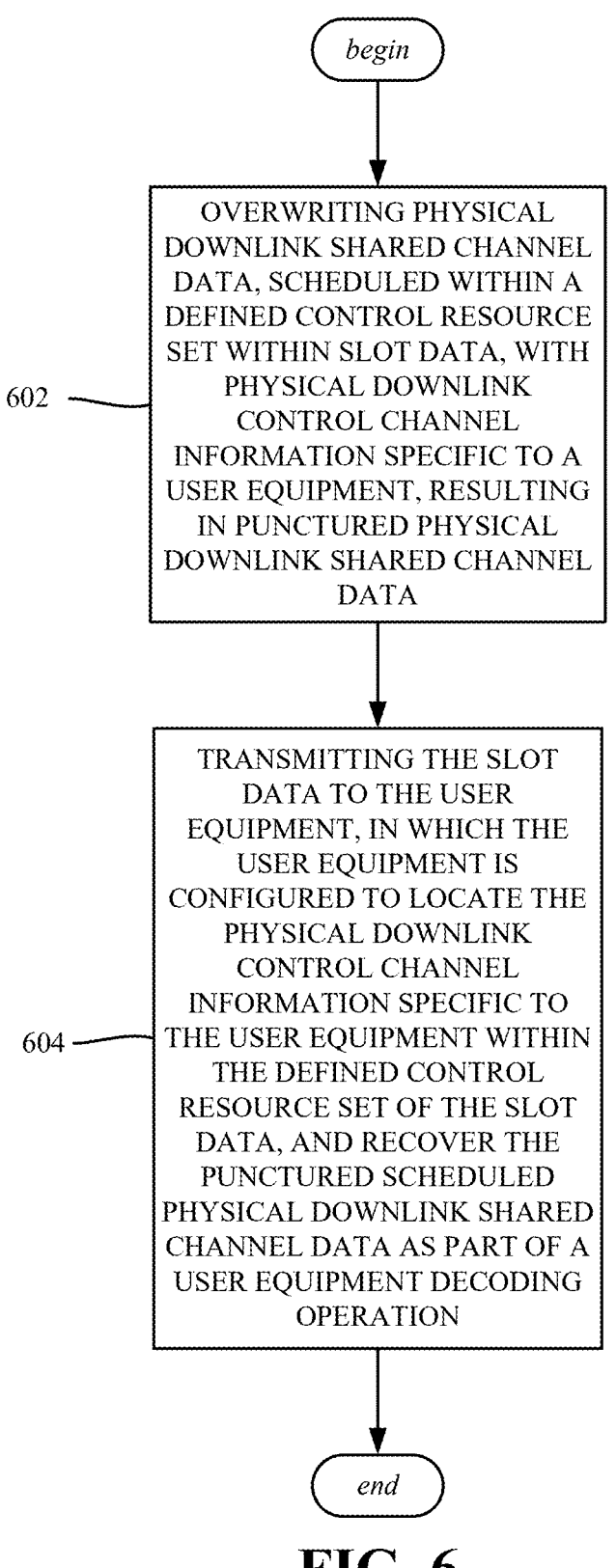

begin

602

OVERWRITING PHYSICAL DOWNLINK SHARED CHANNEL DATA, SCHEDULED WITHIN A DEFINED CONTROL RESOURCE SET WITHIN SLOT DATA, WITH PHYSICAL DOWNLINK CONTROL CHANNEL INFORMATION SPECIFIC TO A USER EQUIPMENT, RESULTING IN PUNCTURED PHYSICAL DOWNLINK SHARED CHANNEL DATA

604

TRANSMITTING THE SLOT DATA TO THE USER EQUIPMENT, IN WHICH THE USER EQUIPMENT IS CONFIGURED TO LOCATE THE PHYSICAL DOWNLINK CONTROL CHANNEL INFORMATION SPECIFIC TO THE USER EQUIPMENT WITHIN THE DEFINED CONTROL RESOURCE SET OF THE SLOT DATA, AND RECOVER THE PUNCTURED SCHEDULED PHYSICAL DOWNLINK SHARED CHANNEL DATA AS PART OF A USER EQUIPMENT DECODING OPERATION end

FIG. 6

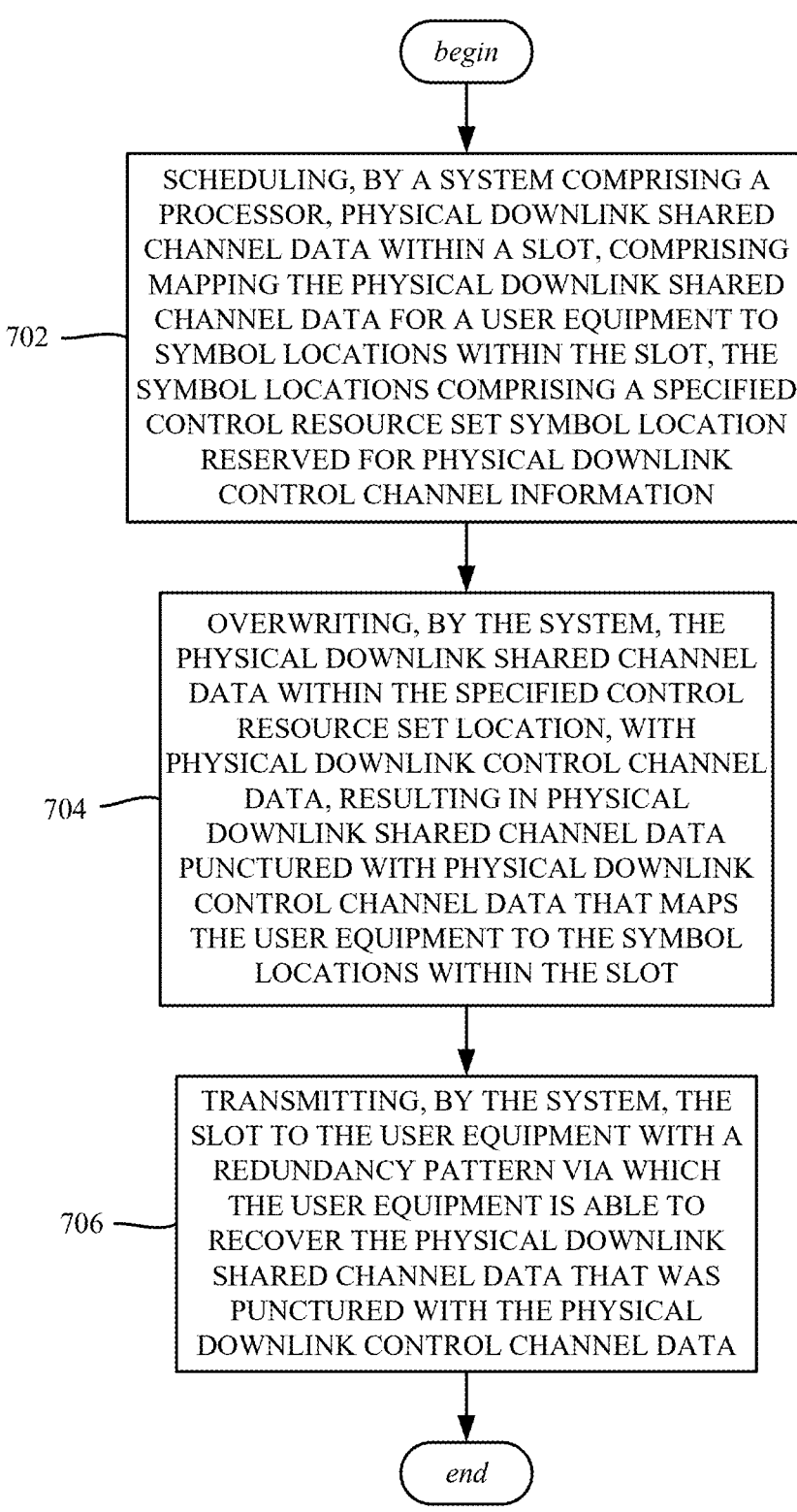

begin

702 — SCHEDULING, BY A SYSTEM COMPRISING A PROCESSOR, PHYSICAL DOWNLINK SHARED CHANNEL DATA WITHIN A SLOT, COMPRISING MAPPING THE PHYSICAL DOWNLINK SHARED CHANNEL DATA FOR A USER EQUIPMENT TO SYMBOL LOCATIONS WITHIN THE SLOT, THE SYMBOL LOCATIONS COMPRISING A SPECIFIED CONTROL RESOURCE SET SYMBOL LOCATION RESERVED FOR PHYSICAL DOWNLINK CONTROL CHANNEL INFORMATION

704 — OVERWRITING, BY THE SYSTEM, THE PHYSICAL DOWNLINK SHARED CHANNEL DATA WITHIN THE SPECIFIED CONTROL RESOURCE SET LOCATION, WITH PHYSICAL DOWNLINK CONTROL CHANNEL DATA, RESULTING IN PHYSICAL DOWNLINK SHARED CHANNEL DATA PUNCTURED WITH PHYSICAL DOWNLINK CONTROL CHANNEL DATA THAT MAPS THE USER EQUIPMENT TO THE SYMBOL LOCATIONS WITHIN THE SLOT

706 — TRANSMITTING, BY THE SYSTEM, THE SLOT TO THE USER EQUIPMENT WITH A REDUNDANCY PATTERN VIA WHICH THE USER EQUIPMENT IS ABLE TO RECOVER THE PHYSICAL DOWNLINK SHARED CHANNEL DATA THAT WAS PUNCTURED WITH THE PHYSICAL DOWNLINK CONTROL CHANNEL DATA end

FIG. 7

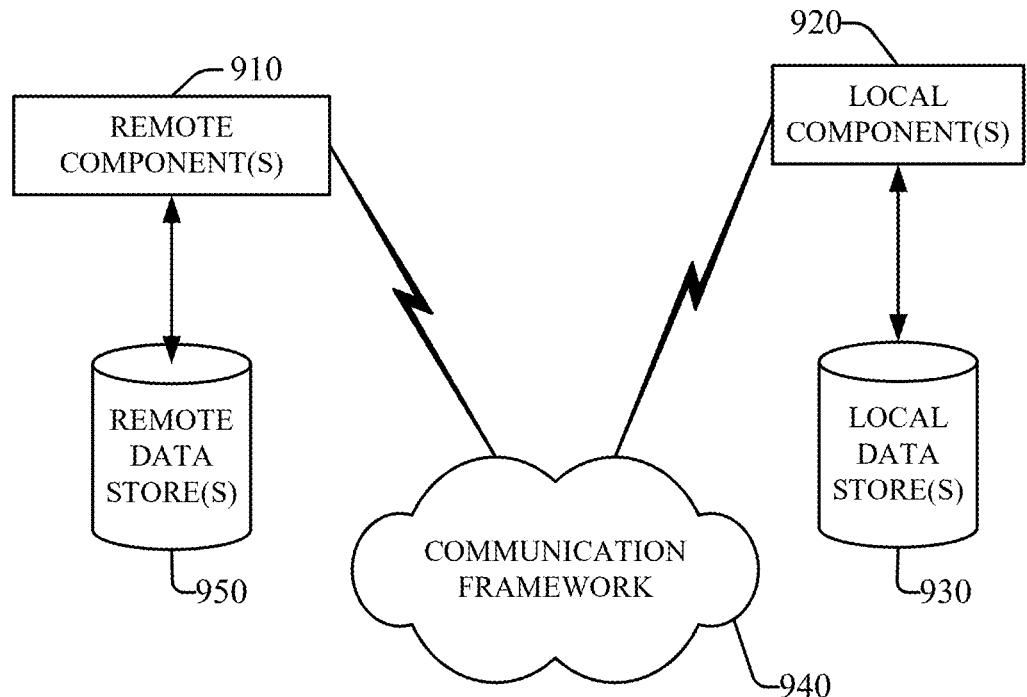
FIG. 9

PUNCTURING TO SCHEDULE DOWNLINK PHYSICAL DATA SHARED CHANNEL ON PHYSICAL DOWNLINK CONTROL CHANNEL SYMBOLS

BACKGROUND

In New Radio (e.g., fifth generation (5G) systems and beyond), there are two main channels used in the downlink to send data to a user equipment (UE), namely the physical downlink control channel (PDCCH) and the physical data shared channel (PDSCH). PDCCH is used for sending location data in time and frequency, and also for conveying other parameters related to decoding the PDSCH.

In general, the PDSCH contains the actual data for the UE. More particularly, a UE decodes the PDCCH information to get the allocation pattern and the configuration data, and with this information the UE decodes the PDSCH channel to get the payload. In many situations, the PDCCH data does not occupy the entire space reserved for downlink control information; however for various reasons the unused space is not able to be used for PDSCH data.

BRIEF DESCRIPTION OF THE DRAWINGS

The technology described herein is illustrated by way of example and not limited in the accompanying figures in which like reference numerals indicate similar elements and in which:

FIG. 1 is an example block diagram representation of an example system/architecture in which radio equipment sends physical data shared channel (PDSCH), including in a symbol of a slot punctured with physical downlink control channel (PDCCH) information, in accordance with various aspects and implementations of the subject disclosure.

FIG. 2 is an example block diagram representation of network (radio) equipment including a scheduler and components related to puncturing a symbol with PDCCH information, in accordance with various aspects and implementations of the subject disclosure.

FIG. 6 is a flow diagram showing example operations related to overwriting PDSCH data with PDCCH information, resulting in punctured physical downlink shared channel data, in accordance with various aspects and implementations of the subject disclosure.

FIG. 7 is a flow diagram showing example operations related to scheduling PDSCH data and overwriting the PDSCH data with PDCCH information, in accordance with various aspects and implementations of the subject disclosure.

FIG. 9 is a block diagram representing an example computing environment into which aspects of the subject matter described herein may be incorporated.

DETAILED DESCRIPTION

Figure 3:
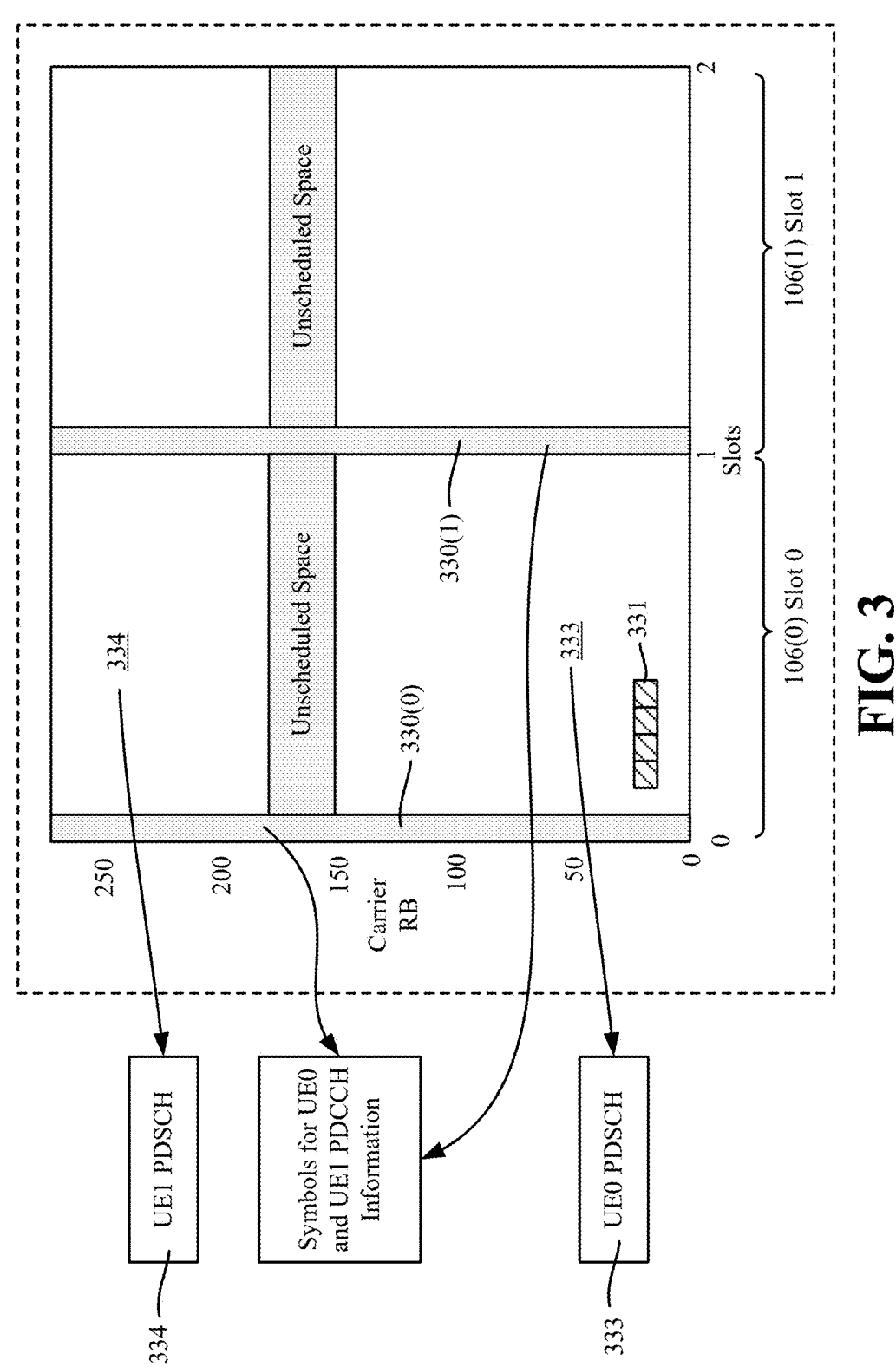
FIG. 3 is a representation of an example pattern of resource allocation before puncturing a slot symbol reserved for PDCCH information, in accordance with various aspects and implementations of the subject disclosure.

Various aspects of the technology described herein are generally directed towards scheduling physical downlink shared channel (PDSCH) data in a slot symbol that is ordinarily defined and reserved for CORESET (control resource set) physical downlink control channel (PDCCH) information (DCI), and subsequently overwriting (puncturing) some of the locations in the slot symbol with CORESET PDCCH information. When transmitting, the coding rate/repetition pattern is adjusted by network equipment such that during PDSCH decoding a receiving user equipment is able to recover the overwritten physical downlink shared channel data. As a result, an entire symbol otherwise reserved for only PDCCH information is able to be used for PDSCH data.

In one example implementation, network equipment including a scheduler first determines that the symbol defined for PDCCH information can be efficiently used for PDSCH data. Once determined to be efficient, the scheduler schedules PDSCH data into PDSCH symbol locations as usual, and also schedules PDSCH data in the symbol otherwise defined for PDCCH information. The network equipment then overwrites the PDSCH data in the symbol defined for PDCCH information with the actual PDCCH information, resulting in punctured PDSCH data in that symbol. The coding rate/repetition pattern can be determined so as to significantly increase the likelihood (reasonably ensure) that any receiving user equipment can, after decoding the PDCCH information, recover the overwritten PDSCH data.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimization," "optimize" or "optimal" and the like (e.g., "maximize," "minimize" and so on) only represent objectives to move towards a more optimal state, rather than necessarily obtaining ideal results.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system/architecture 100, which in this example has radio (network) equipment 102 such as a gNodeB communicating PDCCH downlink control information and PDSCH data to user equipment 104(1)-104(n) via a number of slots, including slots 106(0) and 106(1). Each of the slots 106(0) and 106(1) are composed of symbols, and in the example of FIG. 1 the first symbols of the slots 106(0) and 106(1) are labeled 108(0) and 108(1), respectively, and used for DCI-PDCCH data 110(0) and 110(1), as represented by the lightly-shaded blocks therein.

As described herein, in this example the symbols 108(0) and 108(1) are also used to schedule PDSCH data 112(0) and 112(1), as represented by the unshaded portions of the symbols 108(0) and 108(1). As will be understood, the PDSCH data 112(0) and 112(1) in the symbols 108(0) and 108(1), respectively, are scheduled (e.g., fully) with PDSCH data, and then subsequently overwritten (punctured) with the PDCCH data 110(0) and 110(1). When a user equipment (e.g., 104(2)) receives the transmitted slots, including the slots 106(0) and 106(1), the user equipment 104(2) locates the PDCCH data specific to the user equipment 104(2) (a blind decoding based on a radio temporary network identifier, or RNTI of the user equipment 104(2)), and as part of the decoding process, determines where (at which symbols and frequency locations therein) the PDSCH data for that user equipment 104(2) is located as mapped by its UE-specific PDCCH data within the slot data.

In the event that there is supposed to be PDSCH data specific to that user equipment 104(2) determined by decoding the PDCCH data, the user equipment 104(2) (basically) decodes PDSCH data assuming the code rate is adjusted by network equipment to compensate for the punctured locations, whereby decoding of the PDSCH data correctly recovers the overwritten PDSCH data. At this point, the user equipment 104(2) has the correct PDSCH payload specific to that user equipment 104(2).

FIG. 2 shows an example implementation in which network (radio) equipment 202 such as a gNodeB incorporates a scheduler 224. Based on slot-related data 226 (e.g., number of symbols per slot, the symbol location that is defined for PDCCH, which slot symbols are available for PDSCH data, and so on), and user equipment (UE(s))-related data 228 (e.g., which UEs/RNTIs are being served, the downlink data to schedule for each UE, and so on), the scheduler determines and allocates UE-specific locations for each UE's PDSCH data, and schedules the UE-specific PDSCH data for each user equipment to be served (block 230).

In conventional scheduling, there is a symbol per slot reserved for only PDCCH information, e.g., because which resource element groups are used and which are unused for PDCCH information is not known to a UE, whereby unused PDCCH resource element groups cannot be used for PDSCH. More particularly, the location of PDCCH is dependent on RNTI, CORESET, CCE candidate index, slot number CCE Mapping type, resource element group bundle size and resource element group shift value. The scheduler has to take care of all these cases and map the PDCCH so that it does not overlap with another user equipment's PDCCH. This impacts UE0 PDSCH decoding, because UE 0 does not know about the existence of the UE 1 PDCCH resource element groups, the decoding cannot skip those resource element groups, whereby PDSCH scheduling/decoding in this PDCCH-reserved symbol is problematic, and heretofore not previously performed.

Consider an example case with two user equipment with interleave enabled in the PDCCH symbol, and in which there are two PDCCH locations in the symbol with following configurations, and only blind decoding is available:

| CORESET 1 with BWP start 0 and end 270 . |
| --- |
| CCE resource element group mapping - Interleaved. |
| resource element group Bundle size - 2. |
| Interleave size - 3. |
| Aggregation level - 4. |

Because PDCCH REGs are interleaved on the symbol, the UE0 cannot determine the PDCCH locations occupied by UE1; similarly UE1 cannot determine the locations occupied by UE0, and hence UE0 and UE1 cannot use unused resource element groups from symbol 0 (PDCCH). There are many other possible cases with combination of number of users per slot, interleave pattern, Slot number, RNTI number and CORESET in which a, a scheduler cannot simply use the unused resource element group from PDCCH to allocate that group for PDSCH. Thus, in such cases the scheduler has to ignore the PDCCH symbol (e.g., symbol 0) and let the PDSCH occupy only the space of symbols 1 to 13.

In contrast to conventional scheduling, the technology described herein is able to use the otherwise PDCCH-reserved symbol for scheduling PDSCH data based on puncturing the scheduled PDSCH data with PDCCH information, and then having the UE recover the punctured PDSCH data (along with any other PDSCH data scheduled for that UE) during decoding. To this end, the technology described herein first schedules PDSCH data in the otherwise reserved symbol, and then punctures that symbol with PDCCH resource element groups; as a result, a scheduler can use the space to send PDSCH data. That is, after allocating the PDSCH data, including in the normally reserved PDCCH symbol, the scheduler (or another component of the network equipment 202) overwrites (punctures) at least some of the PDSCH data in the reserved PDCCH symbol with the PDCCH information (block 232 in FIG. 2). In general, the PDCCH information is specific to each UE, which the UE decodes to determine the symbol locations to which the PDSCH data for that UE is mapped.

So that the punctured PDSCH data is not lost, the scheduler 224 (or another component of the network equipment 202), as represented via block 234, determines/selects a redundancy pattern/code rate (i.e., the ratio between the actual data bits and the total transmitted bits (the actual data bits plus redundant bits added for error correction)) such that when the slots for transmission 236 are transmitted and received, a user equipment can recover the overwritten PDSCH data, e.g., via the UE's low density parity check (LDPC) decoder. As shown in FIG. 2, the slots for transmission 236 (via subframes/frames) are sent to a radio unit (block 238) for the actual transmission; note that the radio unit (not explicitly shown) can be considered part of the network equipment 202.

In general, the gNodeB decides, e.g., on a per-slot basis, whether or not to use the defined PDCCH symbol with puncturing as described herein, e.g., based on performance, efficiency or need. The system (e.g., including the gNodeB) needs to be aware that puncturing has been used on PDSCH resource elements, because PDCCH information overwrites some of the PDSCH data whereby the code rate may need adjustment to ensure (ordinarily) that the UE will be able to recover the missing data as part of error correction during decoding. Thus, as represented in FIG. 2, with respect to the code rate, when puncturing is in use with respect to a given transmission, the system (block 234) needs to ensure (at least substantially increase the likelihood so as to ensure that in good conditions) that a UE can effectively decode the signal. Accordingly, the code rate computation is determined so as to compensate for the planned loss of some resource elements due to puncturing. The advantage in doing so is that the otherwise unused resource element groups reserved for PDCCH information are able to be used for PDSCH transmission. It should be noted however that determining the effective code rate to make sure that the UE can decode the data correctly is implementation-specific, and not described herein in detail. In general, the system performance improves when the number of unused resource element groups that are used for PDSCH data, minus the number of punctured resource elements, is greater than zero.

With respect to aggregation, in general, the UE decodes PDCCH to get the allocation pattern and the configuration as described herein. Using these information, the UE decodes the PDSCH channel to get the payload. PDCCH is blind decoding, as per standard the resource blocks are combined into a resource block group, and based on the aggregation level a number of resource block groups are used to transmit PDCCH. In 5G NR, six continuous resource blocks groups (REGs) are treated as one control channel element (CCE), where one resource block group equals one resource block during one OFDM symbol.

| Symbol No. | Aggregation level | Number of CCEs | No. of REs for PDCCH | No of REs for PDCCH-DMRS |
|---|---|---|---|---|
| 1. | 1 | 1 | 9 | 3 |
| 2. | 2 | 2 | 18 | 6 |
| 3. | 4 | 4 | 36 | 12 |
| 4. | 8 | 8 | 72 | 24 |
| 5. | 16 | 16 | 144 | 48 |

Thus, the total number of resource blocks consumed for a DCI, can be computed as: Total number of resource blocks used=Aggregation level*6. For example, if there is only one UE in a slot, and the number of the PDCCH symbol is 1, then for aggregation level 4, the number of resource blocks used for PDCCH=24. In general, for aggregation level 4, 24 RBs from symbol 0are used for sending the PDCCH information, and symbols from 1 to 13 are used for PDSCH data scheduling.

Figure 4:
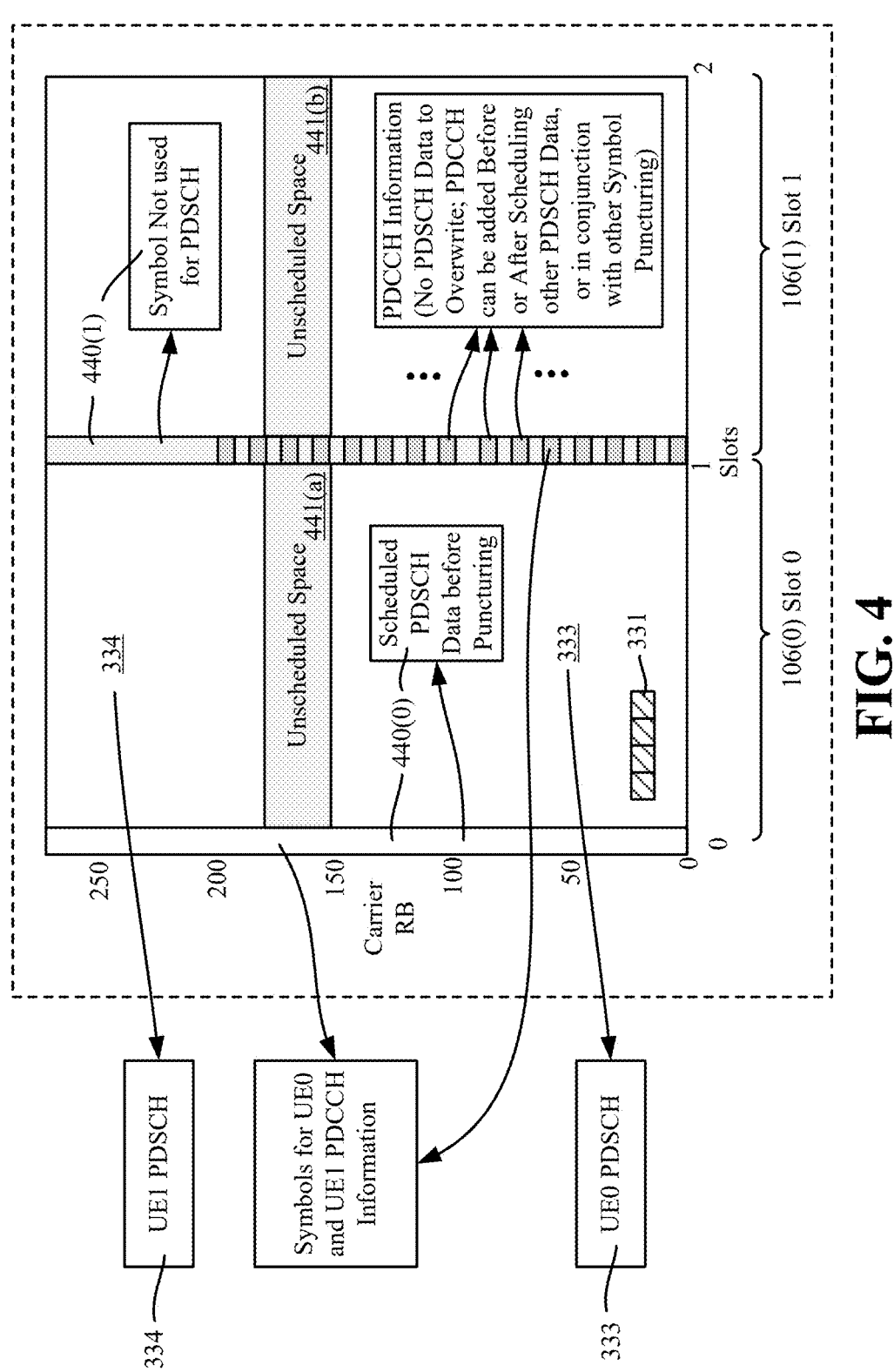
FIG. 4 is a representation of an example pattern of resource allocation after scheduling PDSCH data in the slot, including PDCCH symbol space otherwise reserved for PDCCH information, and before puncturing the PDSCH locations, in accordance with various aspects and implementations of the subject disclosure.
Figure 5:
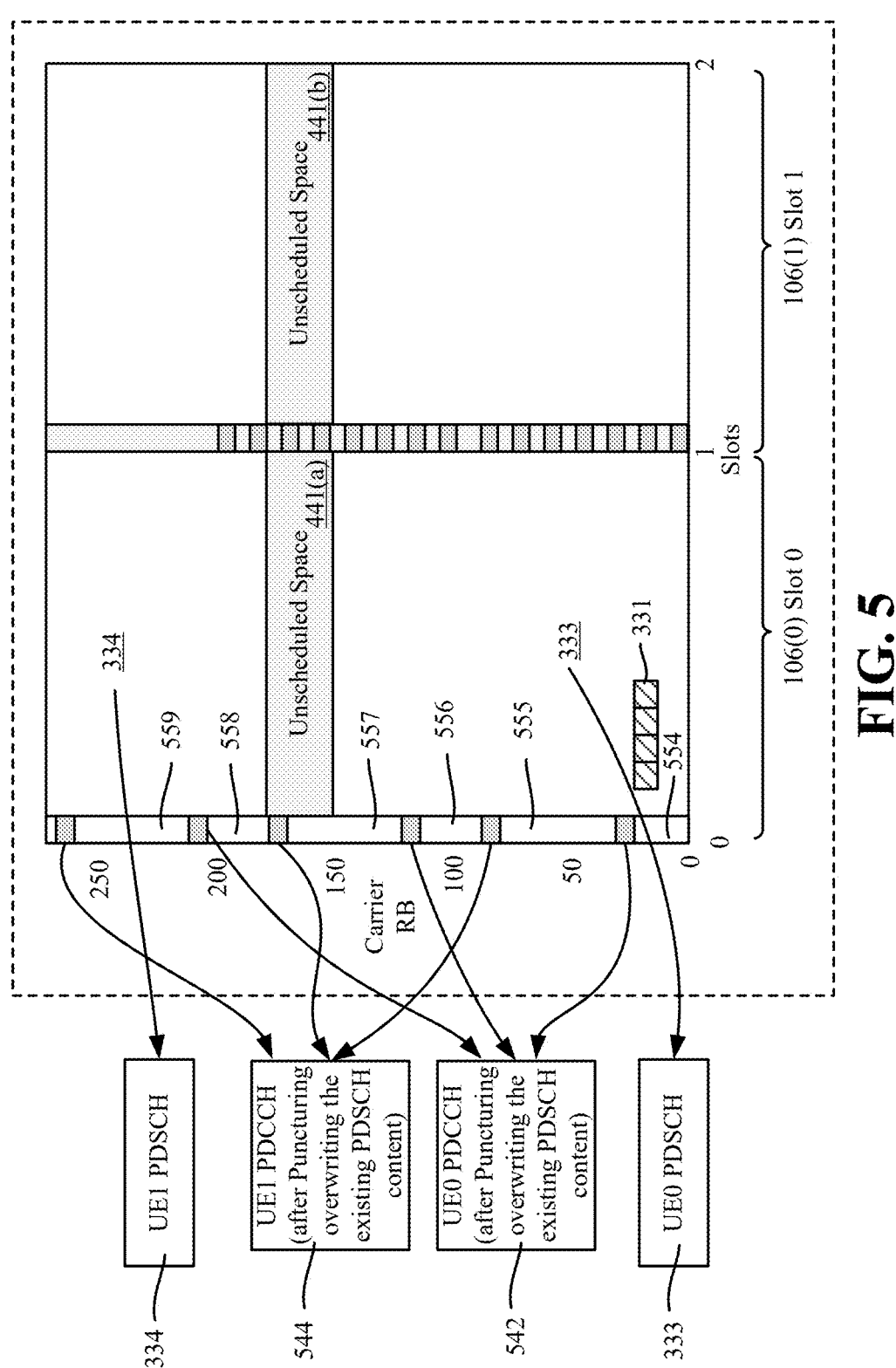
FIG. 5 is a representation of an example pattern of resource allocation after puncturing a slot symbol, which contains scheduled PDSCH data, with PDCCH information, in accordance with various aspects and implementations of the subject disclosure.
Figure 8:
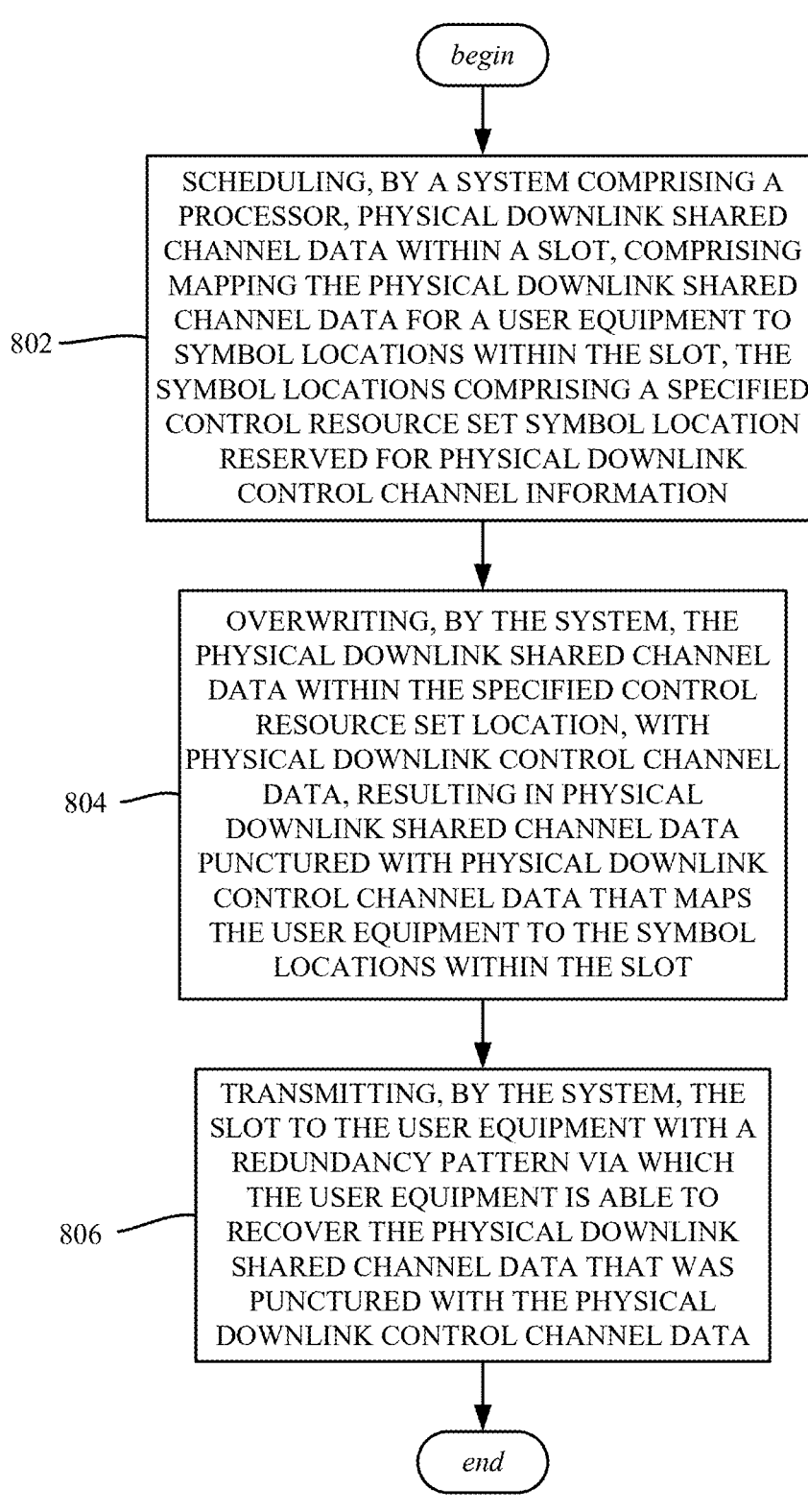
FIG. 8 is a flow diagram showing example operations related to scheduling PDSCH data and overwriting the scheduled PDSCH data with PDCCH information, resulting in punctured physical downlink shared channel data, in accordance with various aspects and implementations of the subject disclosure.

Turning to an example represented in FIGS. 3-5, FIG. 3 shows two slots 106(0) and 106(1), each slot with its first symbol defined for PDCCH information, as represented by the lightly shaded blocks 330(0) and 330(1). The scheduler has the information needed to compute the PDCCH information for the UEs (UE0 and UE1), including the PDCCH locations in the slots 106(0) and 106(1), and the PDSCH data to schedule at locations 333(UE0) and 334(UE1). The block 331 with diagonal striping represents an example Synchronization Signal (SS) burst region, e.g., added as four symbols only on slot 0.

As shown in FIGS. 3 and 4, the scheduler also uses the symbol space 330(0) (in slot 0) for scheduling UE0 and/or UE(1) PDSCH data. This is represented by the unshaded symbol space block 440(0) in FIG. 4. For whatever reason, such as efficiency, the scheduler decides not to schedule the symbol space 330(1) (in slot 1) for scheduling PDSCH data. This is also represented in FIG. 4 by the lightly shaded symbol space 440(1) (in slot 106(1); the scheduler also decides not to scheduler the unallocated PDSCH locations 441(a) and 441(b), although the scheduler alternatively can choose to allocate locations 441(a) and/or 441(b) in any desired pattern or patterns). The darker shaded blocks in the symbol locations in the symbol space 440(1) are shown as containing PDCCH resource element groups. Note that while FIG. 4 shows a "before-puncturing" example of writing the PDCCH resource element groups in the PDCCH symbol 440(1), which will not be punctured, writing the PDCCH information into a symbol that will not be used for PDSCH data can occur independently of puncturing. In other words, if not overwriting PDSCH data, the PDCCH information can be before, after or in conjunction with puncturing, rather than before puncturing. Thus, the PDCCH symbol space that does not contain any PDSCH data can be written with PDCCH information in the conventional way, basically any appropriate time before transmission.

In any event, FIG. 5 shows the slot 106(0) with its PDCCH symbol space after puncturing with PDCCH information (the darker shaded areas pointing to blocks 542 and 544). As can be seen, what was scheduled as PDSCH data (previously unshaded in FIG. 4) in the symbol 0 space of slot 0 106(0) is overwritten with PDCCH resource element groups, resulting in some overwritten PDSCH data and some non-punctured PDSCH data (unshaded blocks 554-559). As described herein, the overwritten PDSCH data is recovered by the UE as part of decoding, By way of example, the following shows some practical results achieved via the technology described herein. Consider the following scenario, in which in a general case, the total bits transmitted for UE0=150*13*12*6*0.8027=112, 699 bits, based on RB*symbol*RE*QAM*code rate. UE1=100*13*12*6*0.8027=75,132 bits.

The advantage can be seen with UE0 scheduled with the number of RBs=150, and the number of symbols=14, and for UE 1, RB=100, symbols=14. In this example, the system knows some of the RB will be overwritten with PDCCH data, and that a code rate of 0.8027 is used for the UE to decode the data.

For the UE0, the calculation is:

Available resource = 150 * 14* 12 * 6 = 151200
in which, as corrupted by PDCCH data, gNodeB = 6 * 6 ~ 32
resource blocks (using equal split of the total used of 64 RBs for UE0 and UE1); or = 32 * 12 * 6 = 2,304 bits, resulting in
151,200 − 2,304 = 148,896 or total bits transmitted = 148,896 * 0.8027 = 119, 518 bits. Similarly, UE1 = 79,062 bits.

One or more aspects can be embodied in network equipment, such as represented in the example operations of FIG. 6, and for example can include a memory that stores computer executable components and/or operations, and a processor that executes computer executable components and/or operations stored in the memory. Example operations can include operation 602, which represents overwriting physical downlink shared channel data, scheduled within a defined control resource set within slot data, with physical downlink control channel information specific to a user equipment, resulting in punctured physical downlink shared channel data. Example operation 604 represents transmitting the slot data to the user equipment, in which the user equipment is configured to locate the physical downlink control channel information specific to the user equipment within the defined control resource set of the slot data, and recover the punctured scheduled physical downlink shared channel data as part of a user equipment decoding operation.

The defined downlink control information control resource set can include an entire symbol of the slot data.

The defined downlink control information control resource set can be within a first symbol of the slot data, (or the first few symbols), for example.

Further operations can include, prior to the overwriting of the defined control resource set, scheduling the physical downlink control channel information within the defined symbol of the slot data.

Overwriting the physical downlink shared channel data can be performed by a gNodeB.

Overwriting the defined control resource set can include overwriting a first subgroup of a larger group of locations in the defined control resource set, and not overwriting a second subgroup, of the larger group of locations in a defined symbol, which can include a portion of the punctured scheduled physical downlink shared channel data.

Further operations can include determining a coding rate that is able to be used to increase a likelihood that the user equipment receives sufficient data according to a defined sufficiency criterion, and wherein the coding rate corresponds to the transmitting of the slot data, to recover the punctured scheduled physical downlink shared channel data.

Further operations can include determining a repetition pattern associated with the transmitting of the slot data that is able to be used to increase a likelihood that the user equipment receives sufficient data according to a defined sufficiency criterion, and wherein the repetition pattern corresponds to the transmitting of the slot, to recover the punctured scheduled physical downlink shared channel data.

The user equipment can be a first user equipment, wherein the overwriting of the physical downlink shared channel data can include overwriting with first physical downlink control channel information for the first user equipment and overwriting with second physical downlink control channel information for a second user equipment, and transmitting the slot data can include transmitting the slot data to the first user equipment and to the second user equipment.

One or more example aspects, such as corresponding to example operations of a method, are represented in FIG. 7. Example operation 702 represents scheduling, by a system comprising a processor, physical downlink shared channel data within a slot, comprising mapping the physical downlink shared channel data for a user equipment to symbol locations within the slot, the symbol locations comprising a specified control resource set symbol location reserved for physical downlink control channel information. Example operation 704 represents overwriting, by the system, the physical downlink shared channel data within the specified control resource set location, with physical downlink control channel data, resulting in physical downlink shared channel data punctured with physical downlink control channel data that maps the user equipment to the symbol locations within the slot. Example operation 706 represents transmitting, by the system, the slot to the user equipment with a redundancy pattern via which the user equipment is able to recover the physical downlink shared channel data that was punctured with the physical downlink control channel data.

Overwriting the specified control resource set can include overwriting a first subgroup of a larger group of locations in the predefined control resource set, and not overwriting a second subgroup, of the larger group of locations in a specified symbol, that can include a portion of the scheduled physical downlink shared channel data.

Further operations can include determining, by the system, a coding rate corresponding to the redundancy pattern.

Further operations can include determining, by the system, a repetition pattern corresponding to the redundancy pattern.

Overwriting the physical downlink shared channel data within the specified control resource set location can be performed by gNodeB equipment.

The user equipment can be a first user equipment, the scheduling can include scheduling of first physical downlink shared channel data within the slot, the overwriting can include overwriting the first the physical downlink shared channel data with first physical downlink control channel data, and further operations can include scheduling, by the system, second physical downlink shared channel data within the slot, comprising mapping the second physical downlink shared channel data for a second user equipment to second symbol locations within the slot, the second symbol locations comprising the specified control resource set symbol location reserved for physical downlink control channel information, and overwriting, by the system, the second physical downlink shared channel data with second physical downlink control channel data, resulting in second physical downlink shared channel data punctured with second physical downlink control channel data that maps the second user equipment to the second symbol locations within the slot; transmitting the slot can include transmitting the slot to the first user equipment and to the second user equipment, with the redundancy pattern via which the first user equipment is able to recover the first physical downlink shared channel data that was punctured with the first physical downlink control channel data, and via which the second user equipment is able to recover the second physical downlink shared channel data that was punctured with the second physical downlink control channel data.

FIG. 9 summarizes various example operations, e.g., corresponding to a machine-readable medium, comprising executable instructions that, when executed by a processor, facilitate performance of operations. Example operation 802 represents overwriting first physical downlink shared channel data, scheduled within a predefined symbol within a slot, with first physical downlink control channel information, resulting in first punctured physical downlink shared channel data. Example operation 804 represents overwriting second physical downlink shared channel data, scheduled within the predefined symbol within a slot, with second physical downlink control channel information, resulting in second punctured physical downlink shared channel data. Example operation 806 represents transmitting the slot to a first user equipment and a second user equipment, wherein the first user equipment is configured to locate the first physical downlink control channel information specific to the first user equipment within the predefined symbol, and recover the first punctured scheduled physical downlink shared channel data, and wherein the second user equipment is configured to locate the second physical downlink control channel information specific to the second user equipment within the predefined symbol, and recover the second punctured scheduled physical downlink shared channel data.

Further operations can include determining a coding rate usable to increase a likelihood that the first user equipment receives sufficient data, corresponding to the transmitting of the slot, to recover the first punctured scheduled physical downlink shared channel data.

Further operations can include determining a repetition pattern associated with the transmitting of the slot usable to increase a likelihood that the first user equipment receives sufficient data, corresponding to the transmitting of the slot, to recover the punctured scheduled physical downlink shared channel data.

Further operations can include, prior to the overwriting of the predefined control resource set, scheduling the first physical downlink control channel information within the predefined symbol of the slot, and scheduling the second physical downlink control channel information within the predefined symbol of the slot.

Overwriting the first physical downlink control channel information can include inserting a first radio network temporary identifier associated with the first user equipment into the first physical downlink control channel information, and inserting a second radio network temporary identifier associated with the second user equipment into the second physical downlink control channel information.

As can be seen, the technology described herein facilitates the scheduling of PDSCH data in a symbol otherwise reserved for PDCCH information. Although the PDCCH overwrites/punctures at least some of the PDSCH locations, and therefore some of the PDSCH data is lost, the needed PDCCH information is present, such that user equipment are able to decode PDCCH normally as in present systems. However, the even though some of the scheduled PDSCH data are corrupted by PDCCH and thus lost, the LDPC decoder on the UE side is able to correct the data for proper decoding. Increasing the coding rate adds more redundancy (aligns the coding rate properly and/or increase repetition is increased such that a UE is able to decode the signal even if there is some data is lost).

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
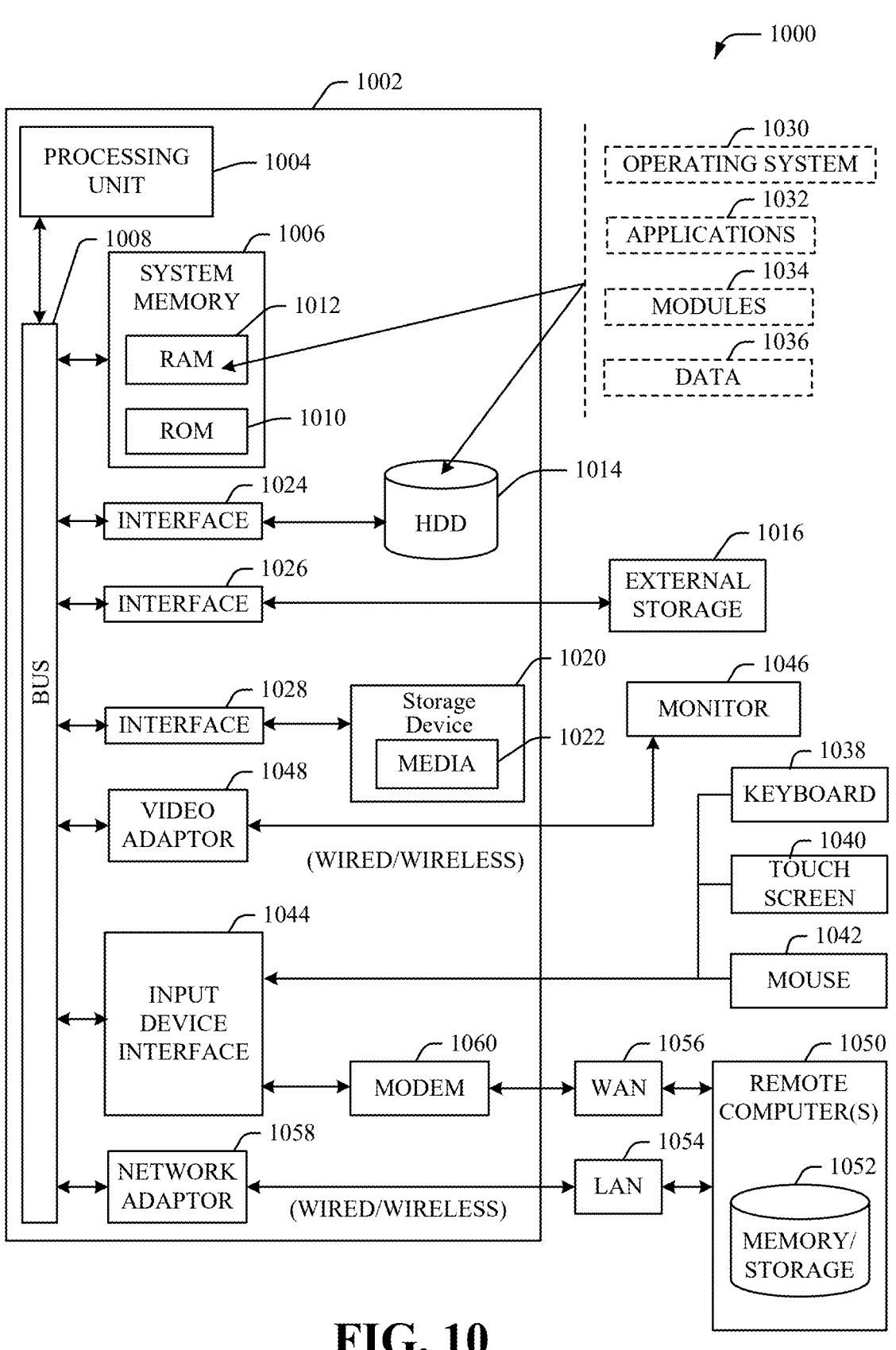
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
at least one processor; and
at least one memory that stores executable instructions that, when executed by the at least one processor, facilitate performance of operations, the operations comprising:
overwriting physical downlink shared channel data, scheduled within a defined control resource set within slot data, with physical downlink control channel information specific to a user equipment, resulting in punctured physical downlink shared channel data,
wherein the overwriting of the physical downlink shared channel data, scheduled within the defined control resource set, comprises overwriting a first subgroup of a larger group of locations in the defined control resource set, and not overwriting a second subgroup, of the larger group of locations in a defined symbol, which comprises a portion of the punctured scheduled physical downlink shared channel data; and
transmitting the slot data to the user equipment, in which the user equipment is configured to locate the physical downlink control channel information specific to the user equipment within the defined control resource set of the slot data and to recover the punctured scheduled physical downlink shared channel data as part of a user equipment decoding operation.

2. The network equipment of claim 1, wherein the defined downlink control information control resource set comprises an entire symbol of the slot data.

3. The network equipment of claim 1, wherein the defined downlink control information control resource set is within a first symbol of the slot data.

4. The network equipment of claim 1, wherein the operations further comprise, prior to the overwriting of the physical downlink shared channel data, scheduled within the defined control resource set, scheduling the physical downlink control channel information within the defined symbol of the slot data.

5. The network equipment of claim 1, wherein the overwriting of the physical downlink shared channel data is performed by a gNodeB.

6. The network equipment of claim 1, wherein the operations further comprise;
determining a coding rate that is able to be used to increase a likelihood that the user equipment receives sufficient data according to a defined sufficiency criterion, and wherein the coding rate corresponds to the transmitting of the slot data, to recover the punctured scheduled physical downlink shared channel data.

7. The network equipment of claim 1, wherein the operations further comprise:
determining a repetition pattern associated with the transmitting of the slot data that is able to be used to increase a likelihood that the user equipment receives sufficient data according to a defined sufficiency criterion, and wherein the repetition pattern corresponds to the transmitting of the slot data, to recover the punctured scheduled physical downlink shared channel data.

8. The network equipment of claim 1, wherein the user equipment is a first user equipment, wherein the overwriting of the physical downlink shared channel data comprises overwriting with first physical downlink control channel information for the first user equipment and overwriting with second physical downlink control channel information for a second user equipment, and wherein the transmitting of the slot data comprises transmitting the slot data to the first user equipment and to the second user equipment.

9. A method, comprising:
scheduling, by a system comprising at least one processor, physical downlink shared channel data within a slot, comprising mapping the physical downlink shared channel data for a user equipment to symbol locations within the slot, the symbol locations corresponding to specified control resource set and comprising a specified control resource set symbol location reserved for physical downlink control channel information;
overwriting, by the system, the physical downlink shared channel data within the specified control resource set symbol location, with physical downlink control channel data, resulting in physical downlink shared channel data punctured with physical downlink control channel data that maps the user equipment to the symbol locations within the slot, resulting in punctured physical downlink shared channel data;
transmitting, by the system, the slot to the user equipment with a redundancy pattern via which the user equipment is able to recover the punctured physical downlink shared channel data that was punctured with the physical downlink control channel data; and determining a repetition pattern corresponding to the redundancy pattern usable to increase a likelihood that the user equipment is able to receive at least a threshold amount of data, corresponding to the transmitting of the slot, to recover the punctured physical downlink shared channel data.

10. The method of claim 9, wherein the overwriting of the physical downlink shared channel data within the specified control resource set symbol location comprises overwriting a first subgroup of a larger group of locations in the specified control resource set, and not overwriting a second subgroup, of the larger group of locations in a specified symbol, that comprises a portion of the physical downlink shared channel data.

11. The method of claim 9, further comprising:

determining, by the system, a coding rate corresponding to the redundancy pattern and usable to increase a likelihood that at least one of the first user equipment is able to receive at least the threshold amount of data, corresponding to the transmitting of the slot, to recover the punctured physical downlink shared channel data.

12. The method of claim 10, wherein the overwriting of the physical downlink shared channel data within the specified control resource set location is performed by gNodeB equipment.

13. The method of claim 9, wherein the user equipment comprises a first user equipment, wherein the scheduling comprises scheduling of first physical downlink shared channel data, of the physical downlink shared channel data, within the slot, and wherein the overwriting comprises overwriting the first the physical downlink shared channel data with first physical downlink control channel data, of the physical downlink control channel data, and the method further comprising:

scheduling, by the system, second physical downlink shared channel data, of the physical downlink shared channel data, within the slot, comprising mapping the second physical downlink shared channel data for a second user equipment, of the user equipment, to second symbol locations within the slot, the second symbol locations comprising the specified control resource set symbol location reserved for the physical downlink control channel information; and overwriting, by the system, the second physical downlink shared channel data with second physical downlink control channel data, resulting in punctured second physical downlink shared channel data punctured with second physical downlink control channel data, of the physical downlink control channel data, that maps the second user equipment to the second symbol locations within the slot.

14. A non-transitory machine-readable medium, comprising executable instructions that, when executed by at least one processor, facilitate performance of operations, the operations comprising:

overwriting first physical downlink shared channel data, scheduled within a specified symbol within a slot, with first physical downlink control channel information, resulting in first punctured physical downlink shared channel data;

overwriting second physical downlink shared channel data, scheduled within the specified symbol within a slot, with second physical downlink control channel information, resulting in second punctured physical downlink shared channel data;

transmitting the slot to a first user equipment and a second user equipment, wherein the first user equipment is configured to locate the first physical downlink control channel information specific to the first user equipment within the specified symbol and to recover the first punctured scheduled physical downlink shared channel data, and wherein the second user equipment is configured to locate the second physical downlink control channel information specific to the second user equipment within the specified symbol and to recover the second punctured scheduled physical downlink shared channel data; and determining a coding rate usable to increase a likelihood that at least one of the first user equipment receives sufficient data, corresponding to the transmitting of the slot, to recover the first punctured scheduled physical downlink shared channel data, or the second user equipment receives at least a threshold amount of data, corresponding to the transmitting of the slot, to recover the second punctured scheduled physical downlink shared channel data.

15. The non-transitory machine-readable medium of claim 14, wherein the operations further comprise;

determining a repetition pattern associated with the transmitting of the slot usable to increase a likelihood that the first user equipment receives at least a threshold amount of data, corresponding to the transmitting of the slot, to recover the punctured scheduled physical downlink shared channel data.

16. The non-transitory machine-readable medium of claim 14, wherein the operations further comprise:

prior to the overwriting of a specified control resource set comprising the first physical downlink shared channel data and the second physical downlink shared channel data, scheduling the first physical downlink control channel information within the specified symbol of the slot, and scheduling the second physical downlink control channel information within the specified symbol of the slot.

17. The non-transitory machine-readable medium of claim 14, wherein the overwriting with the first physical downlink control channel information comprises inserting a first radio network temporary identifier associated with the first user equipment into the first physical downlink control channel information, and wherein the overwriting with the second physical downlink control channel information comprises inserting a second radio network temporary identifier associated with the second user equipment into the second physical downlink control channel information.

18. The network equipment of claim 1, wherein the operations further comprise:

prior to the overwriting of the physical downlink shared channel data, scheduling the physical downlink control channel information within a specified symbol of the slot data.

19. The method of claim 13, wherein the transmitting of the slot comprises transmitting the slot to the first user equipment and to the second user equipment, with the redundancy pattern via which the first user equipment is able to recover the punctured first physical downlink shared channel data that was punctured with the first physical downlink control channel data, and via which the second user equipment is able to recover the punctured second physical downlink shared channel data that was punctured with the second physical downlink control channel data.

20. The non-transitory machine-readable medium of claim 14, wherein the operations further comprise:

determining a repetition pattern associated with the transmitting of the slot usable to increase a likelihood that at least one of the first user equipment receives at least a threshold amount of data, corresponding to the transmitting of the slot, to recover the first punctured scheduled physical downlink shared channel data, or the second user equipment receives at least a threshold amount of data, corresponding to the transmitting of the slot, to recover the second punctured scheduled physical downlink shared channel data.

\* \* \* \* \*